United States Patent [19]

Lechner et al.

[11] Patent Number: 4,809,258
[45] Date of Patent: Feb. 28, 1989

[54] CIRCUIT ARRANGEMENT FOR THE INDICATION OF LOOP CLOSURE DURING THE RINGING CONDITION

[75] Inventors: Robert Lechner, Otterfing; Norbert Wingerath, Munich, both of Fed. Rep. of Germany

[73] Assignee: Siemens Aktiengesellschaft, Berlin and Munich, Fed. Rep. of Germany

[21] Appl. No.: 944,699

[22] Filed: Dec. 19, 1986

[30] Foreign Application Priority Data

Dec. 20, 1985 [DE] Fed. Rep. of Germany ...... 3545358

[51] Int. Cl.$^4$ ............................................ H04Q 11/04
[52] U.S. Cl. ...................................... 370/58; 379/382
[58] Field of Search ................ 370/58, 110.1; 379/382

[56] References Cited

U.S. PATENT DOCUMENTS

| | | | |
|---|---|---|---|
| 3,889,067 | 6/1975 | Reed et al. | 370/58 |
| 4,276,447 | 6/1981 | Shirasu | 379/382 |
| 4,356,355 | 10/1982 | Ferrieu et al. | 379/382 |
| 4,456,991 | 6/1984 | Chea, Jr. et al. | 370/58 |

Primary Examiner—Douglas W. Olms
Attorney, Agent, or Firm—Adel A. Ahmed

[57] ABSTRACT

The invention relates to a circuit arrangement for the indication of loop closure during the ringing condition for a subscriber circuit which is connected to the exchange of a digital time multiplex telephone system by way of a subscriber termination circuit comprising a subscriber line interface circuit which, in part, provides the ringing supply and signalling, and a signal processing unit which, in part, provides for analog to digital conversion and digital to analog conversion as well as for filtering.

The circuit arrangement includes a changeover switch, by way of which, a signal representative of the subscriber termination line current is applied to the signal processing unit during the ringing condition, in place of the speech signal present during the speech condition. This voltage signal is subjected to analog to digital conversion and filtering as for the speech signal at other times except that the high-pass filtering otherwise employed is avoided, and in that the resulting digital signal is further summed over at least one period of the ringing signal frequency. The sum signal is compared with a reference value which provides a loop closure signal when the reference value is exceeded by the sum signal.

10 Claims, 1 Drawing Sheet

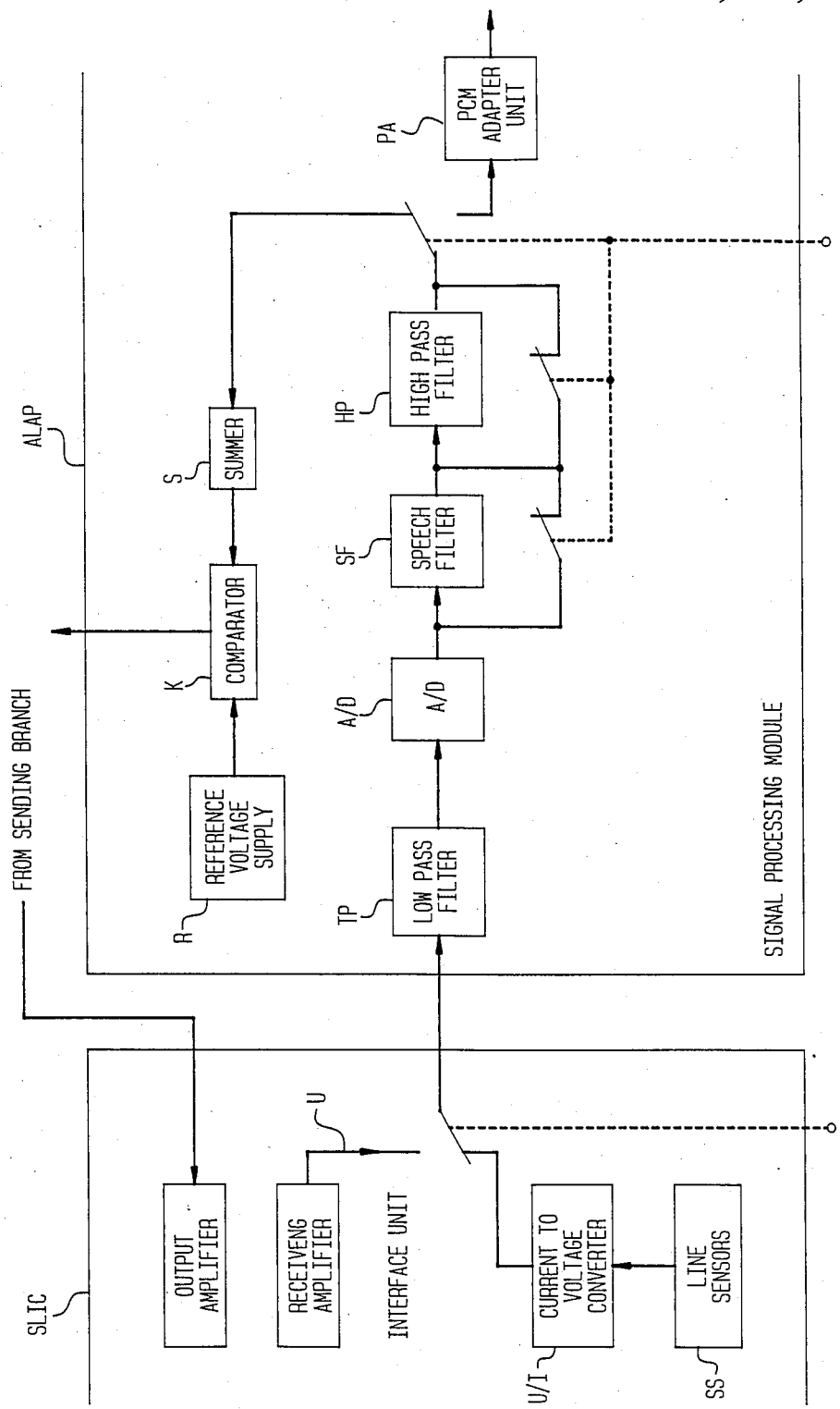

CIRCUIT ARRANGEMENT FOR THE INDICATION OF LOOP CLOSURE DURING THE RINGING CONDITION

BACKGROUND AND SUMMARY OF THE INVENTION

The invention relates to a circuit arrangement for the indication of loop closure during the ringing condition for a subscriber circuit which is connected to the exchange of a digital time multiplex telephone system by way of a subscriber termination circuit comprising a subscriber line interface circuit which, in part, provides the ringing supply and signalling, and a signal processing unit which, in part, provides for analog to digital conversion and digital to analog conversion as well as for filtering.

Particular requirements concerning sensitivity and response time are placed on the indication of loop closure, since the ringing current which is superimposed on the supply circuit when the subscriber loop is closed, flows through the telephone set microphone and can cause destruction if the time interval is too long before ringing is disconnected.

For the indication of ringing, a proportional voltage has in the past been derived from the subscriber termination line current, from which the alternating component arising from the ringing signal was filtered out by a low-pass filter. A comparison was made against a fixed preset threshold value which, when exceeded, resulted in a corresponding signal which was evaluated in a group processor, that is, a processor allocated to a plurality of subscriber termination circuits.

A basic task of the invention is to reduce the hardware cost of such a ringing indication circuit and, at the same time, to be as flexible as possible with regard to the response threshold and the response time.

In accordance with the invention, this task is accomplished in a circuit arrangement of the type referred to at the outset in that this circuit arrangement includes a changeover switching arrangement, by way of which, a voltage signal proportional to the subscriber termination line current is applied to the signal processing unit during the ringing condition, in place of the speech signal present during the speech condition and in that this voltage signal is subjected to an analog to digital conversion and filtering as for the speech signal at other times except that the high-pass filtering otherwise employed is avoided, and in that the resulting digital signal is further therein summed over at least one period of the ringing signal frequency and as a sum signal is compared with a reference value which provides a loop closure signal when the reference value is exceeded by the sum signal.

Accordingly the idea of rendering the capabilities of the signal processing unit useful for the ringing indication is basic to the invention. Since the requirements for this comprise, for the most part, a corresponding matching of processing software in return for which the previously mentioned hardware components for ringing indication are not needed, the hardware costs are lower overall for the circuit arrangement in accordance with the invention.

Further arrangements of the invention concern embodiments relating to the summing and threshold determination of the digital signal derived from the loop current during the ringing phase which make it possible to match the concept according to the invention optimally to practical conditions, namely, to the samples and to the switching behavior on switching on the ringing signal which are basic to the communication system with which the circuit arrangement in accordance with the present invention is associated.

A further embodiment of the invention concerns the special case wherein the ringing signals are applied to the subscriber termination circuitry as digital signals or else are generated in the signal processing unit as digital signals, are therein subject to digital to analog conversion and are applied to the line amplifier circuit of the subscriber termination circuit, and furthermore, amplification specifically for the ringing signal at the input state of this amplifier circuit and a corresponding bias voltage at the output stage thereof are enabled.

The loop closure signal resulting from the comparison in this case is utilized for further switching functions besides interrupting the application or, as the case maybe, the generation of the digital ringing signals.

BRIEF DESCRIPTION OF THE DRAWING

The drawing shows the preferred embodiment of the invention.

DETAILED DESCRIPTION OF THE INVENTION

In the following, the invention will be explained by way of an exemplary embodiment with reference to a drawing FIGURE.

The left side of the FIGURE shows a subscriber line interface unit SLIC which, among other functions, provides for feeding in the ringing signal and for signalling. Other functions of the interface unit are supplying power to the terminal device, the two-wire to four-wire conversion (hybrid function) monitoring of the loop status outside of the ringing condition, and the testing of signal paths.

In reference to the circuit arrangement in accordance with the invention, only a changeover switch U is of fundamental interest, by way of which either the speech signal appearing on the subscriber termination line leading to the present interface module or, otherwise, a voltage signal derived from the line current by way of a current to voltage converter I/U is switched to the output. The left side of the FIGURE, a signal processing module ALAP which serves to provide, among other functions, the analog to digital conversion of the analog signal supplied thereto from interface unit SLIC or, as the case may be, the digital to analog conversion of the digital signals supplied thereto by way of the switching matrix network, not shown here, as well as the filtering in sending and receiving directions.

Only the apparatus and functions relating to the receiving branch are indicated in the FIGURE. These parts and functions comprise an analog to digital converter A/D as well as an input side low-pass filter which prevents signal voltages having frequencies higher than half the sampling frequency at which the analog to digital converter is operated from reaching the analog to digital converter. In addition, there parts and functions comprise a speech filter SF and finally, a high-pass filter for suppressing power line frequency components. In signal processing module ALAP, the output of low-pass filter TP is applied to analog to digital converter A/D which supplies its output to speech filter SF which is cascaded with high-pass filter HP. Each of filters SF and HP can be selectively bridged over or shunted. The output of high pass filter HP is selectively applied either to a PCM adapter unit PA or to a cascaded arrangement of a summer S and an input to a comparator K, as will be further explained below.

In practice only the low-pass filter TP and the apparatus for the analog to digital conversion A/D are in the form of hardware, whereas the functions of speech filtering and high-pass filtering are realized by way of a corresponding operating program of the signal processing module.

The FIGURE further shows that both the speech filter as well as the high-pass filter can be avoided, which in the case of the ringing indication in accordance with the invention is done at least in the case of the high-pass filter, and which in practice is achieved by a correspondingly adapted signal processing procedure.

As stated above, signal processing module ALAP further includes a summer S whose output signal is applied to comparator K which also receives an adjustable reference value from a reference voltage supply R. The functions of the summer, the comparator, and the reference value supply are also realized by way of corresponding operation of the signal processor.

In the following, the operation of the circuit arrangement in accordance with the invention will be explained in further detail.

During the ringing condition being considered here, the switch positions and corresponding functional modes shown in the FIGURE are valid, that is, a voltage signal obtained by way of line sensors SS and the current to voltage converter I/U from the current flowing in the subscriber termination line is applied to the input of the signal processing module ALAP instead of a speech signal appearing on the subscriber termination line; futhermore, this means that the function of high-pass filter HP is not realized. In addition, this means that digital signals provided by the analog to digital converter are summed, and are not further coupled by way of the PCM adapter unit PA to the exchange switching matrix network of which the described circuit arrangement forms a part. The summing takes place over a single period of the ringing frequency, or preferably over a multiple of the period. The alternating components are thereby eliminated, so that only the direct current (DC) component of the voltage applied to the signal processing unit is evaluated. An indication of the occurrence of loop closure is provided by the signal resulting from the summing exceeding the value of the reference voltage. The signal resulting therefrom is evaluated and causes the disconnection of the ringing signal voltage in a manner not shown. In accordance with the invention, a higher reference value is utilized for the comparison at the start of the ringing phase, and is replaced by a lower reference value in the steady state, so as to prevent erroneous evaluations caused by overshoot voltages which may occur when the ringing voltage is switched on.

In the foregoing case of digital generation of the ringing signal by the signal processor itself, the loop closure indicating signal is utilized directly for switching off the ringing signal and for switching over in the subscriber line interface module SLIC the amplification level and, as may be appropriate, the bias voltage on the input and output stages of the module receiving amplifier circuit, not shown here.

We claim:

1. A circuit arrangement for indicating loop closure during a ringing condition in a subscriber termination line, said subscriber termination line being coupled to an exchange of a digital time multiplex telephone system by way of a subscriber line circuit including a subscriber line interface module providing service for, at least, a supply for ringing signal and signalling, said subscriber line circuit further including a signal processing module for providing, at least, analog to digital conversion, digital to analog conversion, signal comparison, signal summing and filtering, wherein said circuit arrangement further comprises:
    switchover means coupled to said signal processing module and said subscriber termination line for applying a signal representative of line current in said subscriber termination line to said signal processing module in said ringing condition, in place of a speech signal present thereat during a speech condition, said signal representative of line current being subjected to analog to digital conversion for providing a digital signal and to filtering in like manner as is said speech signal during said speech condition but without high-pass filtering employed for said speech signal, said digital signal being summed over at least one period of said ringing signal for providing a sum signal, said sum signal being compared with a predetermined threshold level for providing a signal indicative of loop closure when said sum signal exceeds said threshold.

2. The circuit arrangement recited in claim 1, wherein said signal representative of line current applied to said signal processing module is proportional to said line current.

3. The circuit arrangement recited in claim 2, wherein a number of signal components of said digital signal provided by said analog to digital conversion are utilized in forming said sum signal, said number of signal components being smaller than the total number of signal components of said digital signal provided by said analog to digital conversion during a single sampling period of said analog to digital conversion.

4. The circuit arrangement recited in claim 1, wherein said predetermined level has a relatively high value at the start of said ringing condition and a relatively low value following the lapse of a predetermined settling time.

5. The circuit arrangement recited in claim 2, wherein said predetermined level has a relatively high value at the start of said ringing condition and a relatively low value following the lapse of a predetermined settling time.

6. The circuit arrangement recited in claim 3, wherein said predetermined level has a relatively high value at the start of said ringing condition and a relatively low value following the lapse of a predetermined settling time.

7. The circuit arrangement recited in claim 1, wherein said subscriber line circuit includes a receiving amplifier comprising an input amplification stage having a selectable first and second operating gain levels suitable for said ringing and said speech signals, respectively, and an output amplification stage having first and second selectable bias levels suitable for said ringing and said speech signals, respectively, and wherein said ringing signal is applied to said subscriber line circuit in digital form, in reponse to said signal indicative of loop closure, said input and output amplification stages exhibiting said first gain level and said first bias level, respectively, and being responsive to said signal indicative of loop closure for selecting said second gain level and said second bias level when said signal indicative of loop closure no longer causes said ringing signal to be applied.

8. The circuit arrangement recited in claim 2, wherein said subscriber line circuit includes a receiving amplifier comprising an input amplification stage having selectable first and second operating gain levels suitable for said ringing and said speech signals, respectively, and an output amplification stage having first and second selectable bias levels suitable for said ringing and said speech signals, respectively, and wherein said ringing signal is applied to said subscriber line circuit in digital form, in response to said signal indicative of loop closure, said input and output amplification stages exhibiting said first gain level and said first bias level, respectively, and being responsive to said signal indicative of loop closure for selecting said second gain level and said second bias level when said signal indicative of loop closure no longer causes said ringing signal to be applied.

9. The circuit arrangement recited in claim 1, wherein said subscriber line circuit includes a receiving amplifier comprising an input amplification stage having selectable first and second operating gain levels suitable for said ringing and said speech signals, respectively, and an output amplification stage having first and second selectable bias levels suitable for said ringing and said speech signals, respectively, and wherein said ringing signal is generated in said signal processing module in digital form, in response to said signal indicative of loop closure, said input and output amplification stages exhibiting said first gain level and said first bias level, respectively, and being responsive to said signal indicative of loop closure for selecting said second gain level and said second bias level when said signal indicative of loop closure no longer causes said ringing signal to be generated.

10. The circuit arrangement recited in claim 2, wherein said subscriber line circuit includes a receiving amplifier comprising an input amplification stage having selectable first and second operating gain levels suitable for said ringing and said speech signals, respectively, and an output amplification stage having first and second selectable bias levels suitable for said ringing and said speech signals, respectively, and wherein said ringing signal is generated in said signal processing module in digital form, in response to said signal indicative of loop closure, said input and output amplification stages exhibiting said first gain level and said first bias level, respectively, and being responsive to said signal indicative of loop closure for selecting said second gain level and said second bias level when said signal indicative of loop closure no longer causes said ringing signal to be generated.

* * * * *